Fig. 2.

Patented June 6, 1944

2,350,730

UNITED STATES PATENT OFFICE

2,350,730

METHOD FOR CONVERTING HYDROCARBON OILS

William J. Degnen, Cranford, Henry M. Nelly, Jr., Jersey City, and Percival C. Keith, Jr., Peapack, N. J., assignors to The M. W. Kellogg Company, New York, N. Y., a corporation of Delaware Application April 2, 1938, Serial No. 199,702

9 Claims. (Cl. 196—52)

Our invention relates to a method for converting hydrocarbon oils and more particularly to a method for converting high boiling hydrocarbons into low boiling hydrocarbons in the presence of a catalyst.

The catalytic cracking or polymerization of hydrocarbon oils is known to the art. In general, the methods of the prior art consist in heating hydrocarbon oil to cracking temperatures and passing highly heated oil or its vapors through a cracking zone in the presence of a suitable catalyst in order to convert the hydrocarbon oil into the desired products. For various reasons, the catalyst passes through various stages of effectiveness with use, eventually requiring reactivation. Thus, during an operation, the catalyst varies in effectiveness so that, for any given catalyst bed, only average effectiveness is obtained.

One object of our invention is to provide a method of cracking or polymerization in the presence of a catalyst in which the catalytic bed is continuously being removed and revivified so that the catalytic bed will remain of substantially constant effectiveness.

Another object of our invention is to utilize a catalyst chamber in which heat is supplied to the oil vapors passing therethrough to control the temperature drop through the chamber.

Other and further objects of our invention will appear from the following description.

In the accompanying drawings which form part of the instant specification and are to be read in conjunction therewith and in which like reference numerals are used to indicate like parts in the various views.

In general, our invention contemplates the use of apparatus in which oil vapors to be converted are brought into contact with a catalyst in a conversion zone in which the catalyst is continuously being replaced so that the composition of the oil vapor leaving the catalyst chamber will be substantially constant and may flow directly to equipment without precautions being taken for change in its composition. This is a major advantage over the intermittent processes of the prior art in which the products leaving the catalyst chamber may vary in composition. In an intermittent process, for example, in which hydrocarbon oils are cracked to form gasoline-like hydrocarbons, at the beginning of a cracking period the vapors leaving the reaction chamber may contain from 40% to 50% of gasoline, while, at the end of the cracking period, they may contain as low as 15% to 20% of gasoline.

In the intermittent processes, in order to obtain high cracking per pass, the cracking period must necessarily be short due to the fact that the catalyst activity falls off rapidly. In a continuous process, the cracking per pass may be raised by increasing the circulation rate of the catalyst per unit of time.

In the intermittent processes, the oil vapors to be converted pass through the reaction chamber in contact with highly active catalyst only at or near the beginning of a conversion period. During the latter part of the conversion period, the catalyst is progressively decreasing in activity. In our method of continuously circulating a catalyst in contact with the oil vapors, the average composition of the catalyst remains substantially constant and the oil vapor always contacts catalyst of highest activity at some point in the chamber.

The catalyst being continuously removed from the reaction chamber is continuously revivified and recirculated to the catalyst chamber.

Heat is supplied to the reaction chamber to compensate for the loss of heat during the endothermic reaction of cracking. If the apparatus is to be used for polymerization, heat may be removed from the catalyst by a heat exchanging medium to remove the exothermic heat of polymerization.

We will describe our process in connection with the cracking of hydrocarbon oils. It is to be understood, however, that the apparatus may be used for the conversion of light hydrocarbons into heavier hydrocarbons, as well as the conversion of heavy hydrocarbons into lighter hydrocarbons.

Figure 1:
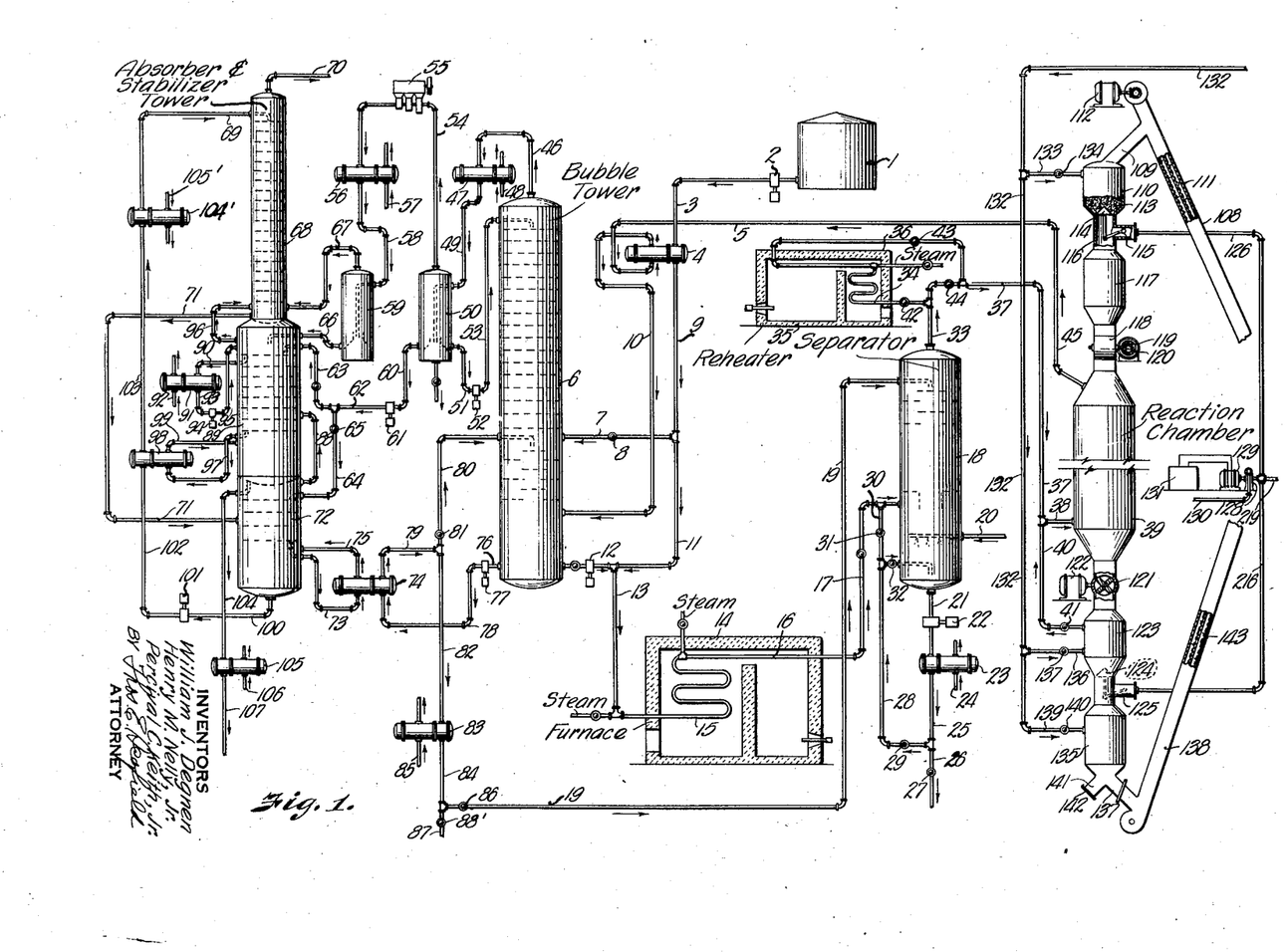
Figure 1 is a diagrammatic view of a portion of the apparatus capable of carrying out the process of our invention.

More particularly referring now to the drawings, the oil to be converted, which may be of any suitable type, is pumped from tank 1 by pump 2 through line 3 through heat exchanger 4, in heat exchange with the products of the cracking reaction which pass to the heat exchanger through line 5. The preheated charging stock leaves heat exchanger 4 through line 9. A portion of the charging stock may be passed into the fractionating tower 6 through line 7, which is controlled by valve 8, as a control reflux. The fractionating tower 6 may be of any suitable type such as a bubble tray tower. The cracked products leave heat exchanger 4 through line 10 and pass into the tower 6 at a point below the introduction of the control reflux through pipe 7. The cracked vapors are cooled by the reflux coursing down the tower and, if desired, the rate of introducing the control reflux may be such that the cracked vapors may be quenched to any desired temperature.

The remainder of the charging stock passes through pipe 11 where it may be joined by reflux condensate from tower 6, being delivered therefrom by pump 12. The preheated oil from pipe 11 and the reflux condensate from pump 12 pass through pipe 13 into a heating means such as pipe still 14. The heating means may be of any suitable type and the charged oil is heated to any suitable cracking temperature preferably between 750° F. and 950° F. or higher in convection heating coil 15 and in radiantly heated tubes 16, the oil being withdrawn from the furnace through transfer pipe 17 for passage into the separator 18 in which it is separated into vapors and unvaporized oil. Provision may be made at various points in the furnace for introduction of steam into the oil stream. Recycle stock withdrawn from the fractionating tower 6 may pass into the separator through pipe 19, to act as refluxing medium in this tower. Dry or superheated steam may be delivered into the separator through pipe 20 to strip further vapors from unvaporized oil and also aid in effecting the nature of conversion in the catalyst bed. Unvaporized oil is withdrawn from the separator through pipe 21 and pumped by pump 22 through a heat exchanger 23 which is supplied with cooling medium through pipe 24. The cooled, unvaporized oil leaves the cooler 23 through pipe 25 and may be passed through pipe 26 controlled by valve 27, to storage. A portion of the cool, unvaporized oil may be returned to the separator through pipe 28, controlled by valve 29, whence it may be delivered through pipe 30, controlled by valve 31, into contact with the highly heated charging stock to control its temperature. A portion of the unvaporized oil may be used as refluxing medium by opening valve 32. The highly heated oil vapors are withdrawn from the separator 18 through pipe 33 and may pass through pipe 34 into furnace 35 for reheating to the desired temperature, which may be between 900° F. and 1000° F., depending upon the type of end product desired and the type of oil being processed. The reheated vapors are withdrawn from the furnace 35 through pipe 36 and passed into pipe 37 for introduction through pipe 38 into the base of the reaction chamber 39. Since the vapors supplied to the base of the reaction chamber 39 flow through the bed of catalyst particles in this chamber and then to the cracked vapors recovery system without intermediate compression in the procedure specifically illustrated, obviously, the pressure of the vapors in the base of the chamber is somewhat above atmospheric and is at least sufficiently high to overcome the frictional resistance to the flow of vapors through the catalyst bed and recovery system. When the vapors pass through the reheater 34, valves 42 and 43 are open and valve 44 is closed. If desired, the reheater may be partially or wholly bypassed by opening valve 44. The cracked vapors are withdrawn from the reaction chamber through pipe 45 and pass into pipe 5 for passage in heat exchange with the incoming charge and introduction through pipe 10 into the fractionating tower 6. The cracked vapors are taken off overhead from the tower 6 through pipe 46 and passed through condenser 47 in heat exchange with the cooling medium introduced through pipe 48.

The condensate leaves the condenser 47 through pipe 49 and is introduced thereby into a separator 50 from which a portion of the condensate is withdrawn through pipe 51 and pumped by pump 52 through pipe 53 for introduction into the top of the tower 6 as condensate reflux. The noncondensable gases and uncondensed vapors leave the separator through pipe 54 and are compressed by compressor 55, cooled in heat exchanger 56 by heat exchange with a cool medium introduced through pipe 57. The compressed and cooled products are withdrawn from the heat exchanger 56 through pipe 58 and passed into a separator 59. The condensate from separator 50 is withdrawn therefrom through pipe 60 and pumped by pump 61 into pipe 62 whence a portion passes through pipe 63 into the stabilizer section of the combined absorber and stabilizer tower and a portion passes through pipe 64 controlled by valve 65 into the stripping section of the combined absorber and stabilizer tower as reflux. The condensate from separator 59 passes under superimposed pressure through pipe 66 into the stabilizer section of the absorber and stabilizer tower. The gases from separator 59 are removed therefrom through pipe 67 and passed into the absorber portion 68 of the combined absorber and stabilizer tower, passing upwardly countercurrent to the absorption oil. The absorption menstruum coursing down the absorber tower countercurrent to the gas, absorbs the valuable heavier, low boiling, normally liquid hydrocarbons from the gas, the dry gas leaving the tower 68 through pipe 70. The rich absorption menstruum withdrawn from the absorber section 68 through pipe 71 passes into the stripping section 72 of the combination tower, whence it is withdrawn from the lower tray through pipe 73 for passage through reboiler 74 and returned through pipe 75 to the base of the stripping section 72. The heat for reboiling is supplied from the hot reflux condensate in tower 6, being withdrawn therefrom through pipe 76 and pumped by pump 77 through pipe 78 for passage through the reboiler 74. The reflux condensate is withdrawn from the reboiler 74 through pipe 79, whence a portion may pass through pipe 80 into the tower 6 as an intermediate reflux, by opening valve 81. The remainder of the reflux condensate from pipe 79 passes through pipe 82, through heat exchanger 83 into pipe 84, cooling medium being supplied to heat exchanger 83 through pipe 85. The cooled reflux condensate may be passed through pipe 19 by opening valve 86, or may be withdrawn through pipe 87 by opening valve 88' for passage to a cycle stock storage tank for future use.

The heat of reboiling denudes the rich absorption menstruum of its absorbed hydrocarbons which pass through pipe 88 into stabilizer section 89 of the combination tower. The top temperature of the stabilizer section is controlled by withdrawing reflux condensate from an upper tray through pipe 90 for passage through cooler 91, for heat exchange with a cool medium supplied through pipe 92. The cooled reflux condensate is withdrawn from the heat exchanger through pipe 93 and pumped by pump 94 through pipe 95 into the top of the stabilizer section 89. The uncondensed vapors and gases are withdrawn from the stabilizer section 89 and passed through pipe 96 into the absorber section 68 for contact with the absorption menstruum along with the gases introduced through pipe 67. Reflux condensate from a lower tray of the stabilizer section 89 is withdrawn through pipe 97 for passage through heat exchanger 98 and returned to the bottom of the stabilizer section 89 through pipe 99. In the heat exchanger 98, the reflux condensate is reboiled by heat supplied by the hot denuded absorption menstruum which is being withdrawn from the bottom of the stripping section 72 through pipe 100 and pumped by pump 101 through pipe 102 through heat exchanger 98, being withdrawn therefrom through pipe 103 and passed through cooler 104 through which cooling medium is supplied through pipe 105'.

The cooled, denuded absorption menstruum leaves the cooler 104' through pipe 69 for introduction to the top of the absorber section 68. The stabilized gasoline is withdrawn from the stabilizer section 89 through pipe 104 and is passed through a final cooler 105 to which a cooling medium is supplied through pipe 106. The cooled stabilized motor fuel leaves the heat exchanger 105 through pipe 107 and is passed to storage.

We have seen that the heated vapors pass into the reaction chamber 39. In the reaction chamber the heated vapors react to form lighter hydrocarbons in the presence of a catalyst. The catalyst in our method is of a granular nature such that it can be fed to and withdrawn from the reaction chamber 39 continuously. The fresh catalyst which may be used or catalyst material which has been revivified, is fed through conveyor 108 for passage through duct 109 into the catalyst feeding hopper 110. Converter 108 completes the circuit whereby the catalyst particles are continuously and successively moved through the conversion zone, intermediate purging and sealing zone, and regeneration zone, thereby attaining the circulation of the catalyst at an elevated temperature throughout the process and the continuous production of a high quality gasoline at a substantial uniform rate and of substantial uniform quality. The conveyor 108 is provided with any suitable conveying means 111, driven by any suitable means such as an electric motor 112. The feeding of the catalyst material 113 from the feeding hopper 110 is controlled by a cone type valve 114, provided with hydraulic operating means 115. The catalyst material passes from the feeding hopper 110 through a duct 116 into a sealing hopper 117, whence it is fed into the reaction chamber by a rotary bucket type valve 118, operated by an electric motor 119, through suitable gears 120. The used catalytic material is withdrawn from the reaction chamber 39 by a rotary bucket type valve 121 operated by an electric motor 122. The motors 120 and 122 may be synchronized so that the rate of feeding and the rate of withdrawal are kept the same. The used catalytic material passes into a sealing hopper 123, the discharge of which is controlled by a cone type valve 124, operated by a hydraulic operating mechanism 125. The hydraulic operating mechanisms 115 and 125 are adapted to be supplied with hydraulic fluid through pipes 126 and 127. A fluid pump 128 operated by an electric motor 129 supplies the fluid from pipe 130 for functioning the hydraulic operating mechanisms 115 and 125. A timing control mechanism 131 of any suitable type known to the art controls the electric motor 129 so that the cone type valves 114 and 124 are intermittently operated to introduce fresh catalytic material into sealing hopper 117 and to withdraw used catalytic material from sealing hopper 123. An inert gas, such as flue gas, steam, or the denuded dry gas from 70, if desired, under suitable pressure and at a suitable temperature, is introduced into manifold 132. A pipe 133, controlled by a valve 134, permits gas from manifold 132 to flow into feeding hopper 110. The pressure of the gas is such that it is slightly in excess of that existing in the catalyst chamber. The imposition of this pressure in feeding hopper 110 and in upper sealing hopper 117 will effectively prevent leakage outward of the cracked vapors. Any leakage which might occur will be into the reaction chamber 39. The capacity of the discharge hopper 135 is sufficiently greater than the lower sealing hopper 123 so that there will always be a quantity of material present in discharge hopper 135. Thus continuity of feed to the revivifier is assured. The pressure in feeding hopper 110 may be readily controlled by value 134 which may be automatically controlled by differential pressure controller between the feeding hopper 110 and the reaction chamber, if desired.

Sealing gas from manifold 132 is also introduced through pipe 136 controlled by valve 137 into the lower sealing hopper 123. By control of valve 137, the pressure within lower sealing hopper 123 is controlled to be slightly in excess of that which exists in pipe 37 and in the reaction chamber 39 so that the gas introduced into the lower sealing hopper 123 will denude and strip the discharged catalytic material of vapors which are carried either absorbed in the catalytic material or physically mixed in the mass. The stripped vapors and sealing gas will leave the lower sealing hopper 123 through pipe 40 which is controlled by valve 41 and pass through pipe 38 into the reaction chamber along with the hot vapors to be reacted in the reaction chamber.

The stripped, used catalyst passes into the discharge hopper 135, whence it passes through duct 137 and is fed by conveyor 138 to the revivifying operation. Sealing gas from manifold 132 passes through the pipe 139 controlled by valve 140 into the discharge hopper 135. If it is desired to locate the revivifier adjacent the reaction chamber, the used catalytic material may be withdrawn through duct 141 normally sealed by a cover plate 142.

Any desired rate of catalyst flow may be obtained by controlling the speed of motors 120 and 122. The timing arrangement 131 is so controlled that cone type valves 114 and 124 are operated with sufficient frequency to keep a supply of material in feeding hopper 117 and the discharge hopper 123 sufficiently free of material to receive the used catalytic material flowing from the reaction chamber past valve 121. It will be obvious, of course, that the conveyors will be operated at a synchronous speed to keep the upper sealing hopper 110 supplied with material and maintain the material in the lower sealing hopper 135 at a safe operating level.

Figure 2:
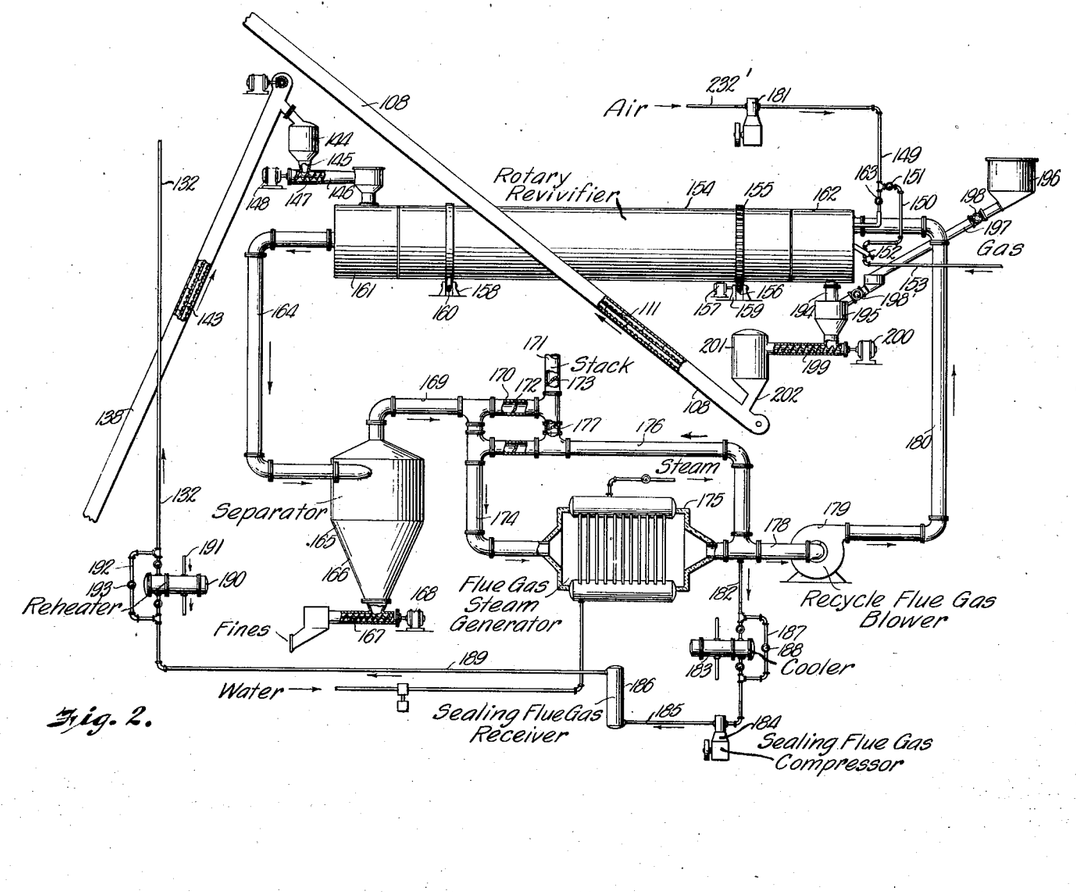
Figure 2 shows one modification of the revivifying apparatus used in connection with that portion of the apparatus shown in Figure 1.

Referring now to Fig. 2, we show one embodiment of a revivifying apparatus capable of continuously revivifying the used catalytic material. Conveyor 138 provided with suitable conveying means 143 feeds the used catalytic material into a hopper 144, from which it is withdrawn through duct 145 and passed through a conveyor tube 146 by a feeeding screw 147 operated by an electric motor 148. The conveyor tube 146 and the feeding screw 147 are tapered to cause the catalytic material to pack densely, enabling it, per se, to act as a seal.

The pressure of the sealing gas in the discharge hopper 135 exists throughout the conveyor tube 138 and in feeding hopper 144, so that any leakage will be merely of material inwardly toward the revivifier. The revivifier is of the rotary kiln type in which the catalytic material is contacted with a gas which will effectively remove all or some of the carbon absorbed in the process and regenerate the catalyst to active condition. Producer gas reactions enabling a removal of carbon by reduction of carbon dioxide and steam may be employed, though we prefer to use simple oxidation with air.

In starting the operation of the revivifier, air from the air manifold 149 passes through pipe 150 through valve 151, to a burner 152, to which fuel gas is supplied through the pipe 153. The kiln shell 154 is provided with a ring gear 155 meshing with the pinion 156 which is driven by an electric motor 157, enabling the kiln to rotate upon its saddles 158 and 159, on suitable rollers 160. End sections 161 and 162 are stationary.

After the revivifier reaches a sufficient temperature, the burner 152 is shut off and valve 151 is closed. Valve 163 is opened and air under pressure is passed into the revivifier in contact with the used catalytic material. The resulting oxidation will burn the carbon and adsorbed compounds from the catalyst material, revivifying it. The resulting products of combustion are withdrawn from the revivifier through duct 164 and pass through a centrifugal separator 165 for removal of entrained catalytic material dust, which is collected in the separator bottom 166 and removed therefrom by conveyor screw 167 operated by an electric motor 168.

The clean flue gases leave the separator 165 through duct 169 and may pass through duct 170 to the stack 171 by opening dampers 172 and 173. The heat in the gases resulting from revivification of the catalyst may be recovered in part by passing them through a flue gas steam generator 175, after which they may pass through duct 176, past damper 177 to the stack 171. A portion of the cooled flue gases may be withdrawn through duct 178 by blower 179 and passed through duct 180 for recirculation to the revivifier to control the temperature of the revivification.

A compressor 181 supplies air to pipe 149 for passage to the revivifier. A portion of the gases of revivification may be withdrawn through pipe 182 and passed through cooler 183 for compression by compressor 184 and passage through pipe 185 to a sealing gas receiver 186. The cooler may be by-passed by by-pass pipe 187 controlled by valve 188. The compressed flue gases in flue gas receiver acts as a source of sealing gas for the sealing gas system heretofore described. The sealing gas is withdrawn from the flue gas receiver 186 through pipe 189 and may be passed, if desired, through a reheater 190 for heat exchange with a hot medium such as superheated steam or a portion of hot flue gas from duct 164, supplied to heat exchanger through pipe 191. The sealing gas may by-pass the reheater 190 through pipe 192, controlled by valve 193. The sealing gas passes from the reheater 190 or from by-pass line 192 into the sealing gas manifold 132. The rotary revivifier is mounted at a slight angle, the stationary section 162 being lower than the stationary section 161, so that the revivified catalytic material passes from the revivifier through duct 194 into a discharge hopper 195. Fresh catalytic material may be added at this point from hopper 196 through duct 197 controlled by valves 198 and 198'.

The catalytic material which is too fine for recycling passes out with the flue gases of revivification and is separated in the separator 165. The revivified catalytic material from hopper 195 is fed by screw conveyor 199, which is operated by electric motor 200, into conveyor feeding chamber 201, from which the catalytic material passes through duct 202 to the fresh catalytic material conveyor tube 108 for carriage by conveyor means 111 to the reaction chamber catalyst feeding hopper 110.

Figure 3:
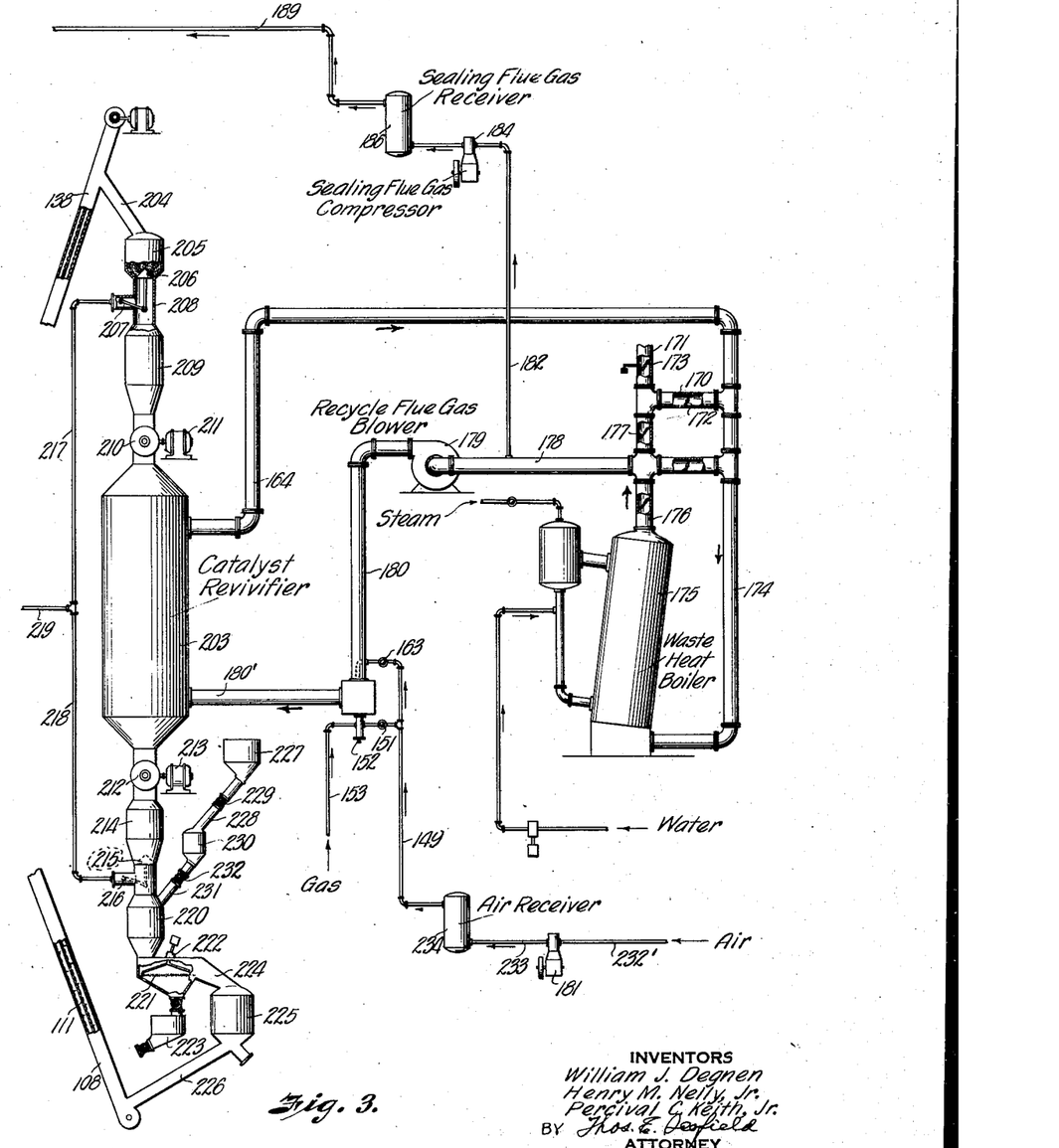
Figure 3 shows another modification of revivifying apparatus capable of being used in connection with the apparatus shown in Figure 1 for carrying out our invention.

Referring now to Fig. 3, we have shown use of another means for revivifying the used catalytic material. In this embodiment of our invention, the catalytic revivifying chamber 203 is a vertical chamber which may be operated at a pressure equal to that employed in the reaction chamber. In this modification the used catalytic material passing through conveyor tube 138 passes through duct 204 into a feeding hopper 205 provided with a cone type valve 206 and hydraulic operating mechanism 207. A duct 208 connects the feeding hopper 205 with a sealing hopper 209. A rotary bucket type valve 210 operated by a motor 211 is provided for passing the catalytic material to be revivified into the revivifying chamber 203. The revivified catalytic material is withdrawn from the revivifying chamber 203 by bucket type valve 212 operated by an electric motor 213, for passage into sealing hopper 214. The revivified catalytic material leaves hopper 214 past a cone type valve 215. The cone type valve 215 is provided with hydraulic operating mechanism 216. The hydraulic operating mechanisms 207 and 216 are supplied with hydraulic operating fluid through pipes 217 and 218 which are in turn supplied through pipe 219 by pump 128 (Figure 1). It will be observed that the four hydraulic operating mechanisms, that is, mechanisms 115 and 125 of the reaction chamber, and 207 and 216 of the revivifying chamber, are interconnected so that the revivifying operation and cracking operation are synchronized to continuously supply catalyst and revivify it for reuse. In other words, the catalyst material is continuously passed from the revivifier to the reaction chamber, back to the revivifier in a continuous circulating path, and the hot vapors to be cracked are continuously passed in contact with the moving stream of catalytic material. The revivified catalytic material from sealing chamber 214 passes the cone type valve 215 for delivery into discharge hopper 220.

A vibrating screen 221 provided with vibratory actuating means 222 screens out the fines which pass into a fines collecting hopper 223. The revivified screened catalytic material passes through duct 224 into a hopper 225 from which it is withdrawn through duct 226 for passage to the feeding conveyor tube 108, for carriage by conveying means 111 to the reaction chamber catalytic material feeding hopper 110. Fresh catalytic material to replace the fines is supplied from hopper 227 through duct 228 controlled by valve 229, and auxiliary hopper 230 and duct 231, which is controlled by valve 232. It will be noted that the catalytic revivifier is under pressure, and the auxiliary hopper 230 acts as a lock. In other words, by operating valve 229, catalytic material is fed from hopper 227 to the auxiliary hopper 230. Valve 229 is then closed and valve 232 is opened, permitting material to pass through duct 231 into the revivified catalytic material discharge hopper 220.

The revivification of the catalytic material in the revivifier chamber 203 is by oxidation of the carbon and adsorbed heavy hydrocarbons. Air is taken from the atmosphere through air intake pipe 232' and is compressed by compressor 181' and delivered through pipe 233 to an air receiver tank 234 which supplies air through pipe 149.

In starting, the valve 151 is opened to supply air to the burner 152, to which fuel gas is supplied through pipe 153, the hot gases passing through duct 180' into the revivifying chamber 203. After the chamber is sufficiently heated, valve 151 is closed and valve 163 is opened to permit air to pass through duct 180' into the revivifying chamber. The gases of combustion during the revivification reaction are withdrawn from the revivifying chamber 203 through duct 164, and may be passed as before through duct 170 to stack 171 by opening dampers 172 and 173. If desired, heat from the gases of combustion may be recovered by passing them through duct 174, through a waste heat boiler 175 and thence through duct 176 to the flue pipe 171 past damper 177 and damper 173.

The blower 179 is adapted to withdraw flue gases through duct 178 for delivery through duct 180, for controlling the temperature of the revivification reaction. Flue gas is withdrawn from duct 178 through pipe 182 for compression by compressor 184 and delivery to the sealing flue gas receiver 186 as before.

Figure 4:
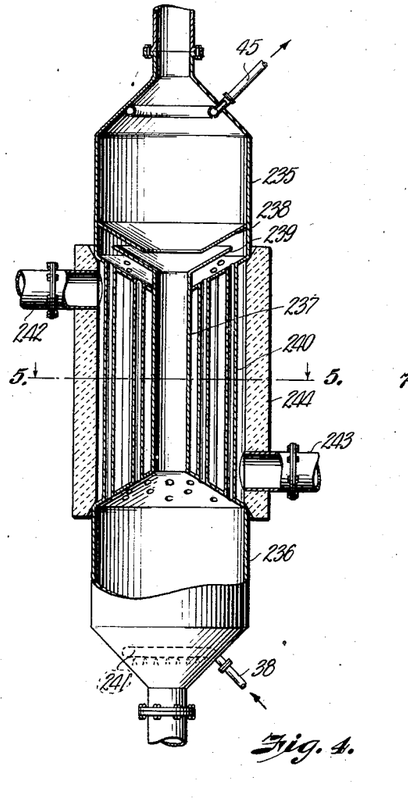
Figure 4 is a sectional view of a catalyst contact chamber adapted to be used in carrying out our invention.
Figure 5:
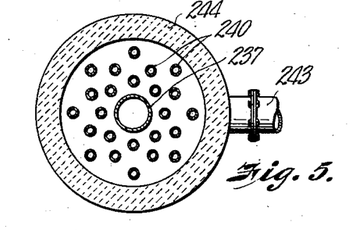
Figure 5 is a sectional view taken on a line 5—5 of Figure 4.

Referring now to Figs. 4 and 5, we have shown use of catalytic reaction chambers provided with means for continuously heating the reaction zone in order to compensate for the endothermic reaction of cracking. The reaction chamber in Fig. 4 is constructed with an upper section 235 and a lower section 236 connected by a central passage 237 of fairly large diameter. The upper section 235 is provided with baffles 238 and 239 for directing the catalytic material to the central passage 237. Tubes 240 extend between sections 235 and 236, as can be readily seen by reference to Figs. 4 and 5.

Vapors introduced through pipe 38 are distributed by a manifold 241 and pass upwardly through the catalytic material and through tubes 240, and are withdrawn through pipe 45. The baffles 238 and 239 prevent the catalytic material from clogging the tubes 240. Any suitable heating medium, such as hot gases of combustion or mercury vapors or the like, are introduced through duct 242, for passage in heat exchange relation around the exterior of the tubes 240 and central passage 237, and are withdrawn through a duct 243. The heat exchanger section of the reaction chamber may be insulated by an insulating jacket 244 of suitable insulating material.

Figure 6:
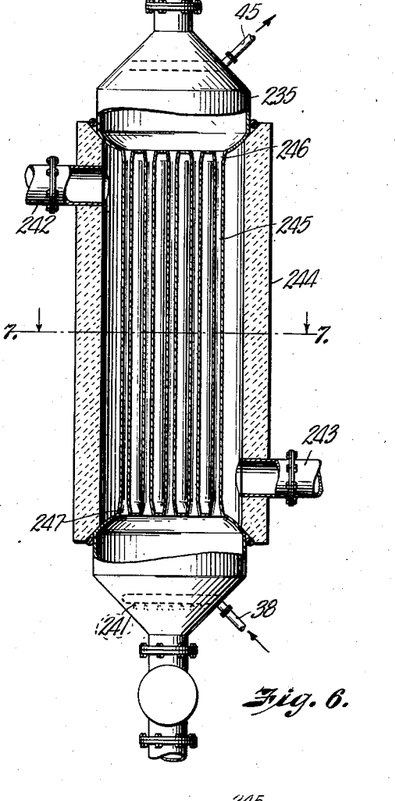
Figure 6 is another modification of a catalyst contact chamber capable of use in carrying out the process of our invention.
Figure 7:
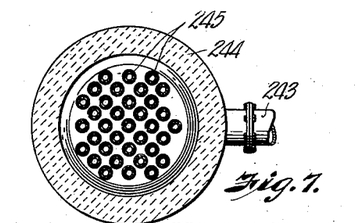
Figure 7 is a sectional view taken on the line 7—7 of Figure 6.

Referring now to Figs. 6 and 7, another embodiment using a heated catalytic reaction chamber is shown. In this embodiment, the catalytic material passes through heat exchanger tubes 245 which are provided at their upper ends with funnel-like portions 246, to direct the flowing catalytic material into the tubes 245. Similarly, the outlet sections of the tubes 245 are provided with funnel-like sections 247, the heating section of the reaction chamber being jacketed by heat insulating material 244, as before.

By way of illustration and not by way of limitation, a Mid-Continent virgin gas oil was supplied to tank 1 as charging stock for the process. The catalytic material was alumina deposited upon silica gel. The reaction temperature maintained within the catalyst bed varied from 840° F. at the bottom to 890° F. at the top. The time in which the catalyst was retained in passing through the chamber was about 3.25 hours. The space velocity during the operation was 4.28 barrels per hour of charge per ton of catalyst material in the bed. Under these conditions the following yields were obtained.

Gasoline (100% $C_4$ recovery)

| | |
|---|---|
| per cent volume | 46 |
| Cycle stock _____________________________ do | 48 |
| Gas _______________________ per cent weight | 9 |
| Coke _______________________________ do | 2.4 |

The catalyst was continuously revivified. The gasoline yield from this run is approximately 12% greater than that predicted for a run under similar conditions made in a stationary catalyst bed.

During the revivifying of the catalyst, it was found that the first 50% of the carbonaceous material absorbed is removed by burning with relative ease. The last half of the carbonaceous material requires a considerably longer time for revivification. In this connection it is to be noted that it is not necessary to remove all of the carbonaceous material from the catalyst, as the removal of a certain portion of it will revivify the catalyst to produce good results during the cracking reaction. For example, where the total carbon absorbed in one run amounted to 17% by weight of the catalyst, it was found that a reduction of the carbon by burning to 7.2% by weight of the catalyst gave a catalytic material which gave favorable results as compared with an operation in which fresh catalyst was continuously charged.

It is believed that from the foregoing description our method will be clear to those skilled in the art. The operation of the apparatus will be understood from the foregoing description. It will be seen that we have accomplished the objects of our invention. We have provided a method of catalytic cracking in which the composition of the oil vapor leaving the catalyst chamber is substantially constant. This enables it to flow directly to the fractionating and stabilization equipment without special precaution being taken for periodic changes in its composition. This is not true in the intermittent process in which the gasoline content of the vapors leaving the reaction chamber may vary from 40% to 50% at the start of the cycle, and be as low as 15% to 20% at the end of the cycle.

In order to obtain a very high cracking per pass in the intermittent process the cycles must necessarily be short due to the rapid falling off of catalyst activity. In our process of continuous catalytic material replacement, the cracking per pass may be raised by circulating more catalyst per unit of time. In the intermittent process the vapors contact highly active catalytic material only a short period of time. In our process highly active catalytic material is constantly being supplied so that there is always present in the reaction zone a considerable bed of highly active catalytic material.

Although the apparatus has been described in connection with a process operated under pressure conditions slightly above atmospheric, it may as well be operated at atmospheric pressure or under sub-atmospheric or vacuum conditions.

While a catalytic cracking process has been described as particularly adapted to the apparatus, it is also suited to other endothermic catalytic reactions such as dehydrogenation of hydrocarbon oils and gases. To adapt the apparatus to exothermic reactions such as catalytic polymerization or synthesis reactions, provision would be made for removing excess heat produced during the reactions.

We supply the heat of reaction continuously during the cracking reaction, to enable us to obtain a high percentage of cracking per pass. It is to be understood, of course, that if desired, a non-heated type of reaction chamber may be employed, and the heat supplied by high preheat of the cracked vapors.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a process for the catalytic conversion of hydrocarbons by passing the hydrocarbons in the vapor phase through a reaction zone filled with catalyst granules and maintained at a temperature suitable for the desired conversion, the improvement which consists in withdrawing used catalyst from said zone at suitable intervals during the reaction and replacing catalyst thus withdrawn with active catalyst, thereby maintaining the volume of catalyst in said zone and the average activity thereof substantially constant throughout the reaction, and maintaining a confined zone containing a supply of active catalyst and a similar zone containing an accumulation of used catalyst, each respectively associated with the catalyst replacement and withdrawal portions of the reaction zone, under an inert gas pressure greater than the pressure of said reaction zone.

2. In a continuous process for the catalytic conversion of high boiling hydrocarbons to low boiling hydrocarbons within the gasoline boiling range, involving passing the high boiling hydrocarbons in the vapor phase through a conversion zone in contact with particles of a cracking catalyst and maintained at an elevated temperature suitable for the desired conversion, the improvement which consists in withdrawing used catalyst particles from the conversion zone during the reaction and replacing catalyst particles thus withdrawn with active catalyst particles, thereby maintaining the volume of catalyst in said zone and the average activity thereof substantially constant throughout the reaction, maintaining a confined intermediate sealing zone containing an accumulation of used catalyst thus withdrawn in proximity to but separate from the conversion zone, and maintaining said latter zone under an inert gas pressure greater than the pressure of said reaction zone and purging the accumulated catalyst therein of entrained and adsorbed conversion products by circulating an inert gas therethrough, maintaining a body of spent catalyst particles withdrawn from said intermediate zone in contact with an oxygen-containing gas in a confined regenerating zone until the catalyst is revivified, and continuously and successively moving the catalyst particles through said conversion zone, intermediate purging and sealing zone, and regeneration zone thereby attaining the circulation of the catalyst at an elevated temperature throughout the process and the continuous production of a high quality gasoline at a substantial uniform rate and of substantial uniform quality.

3. In a continuous process for the catalytic conversion of high boiling hydrocarbons to low boiling hydrocarbons within the gasoline boiling range, involving passing the high boiling hydrocarbons in the vapor phase through a conversion zone in contact with a body of catalyst particles maintained at a temperature suitable for the desired conversion, the improvement which consists in continuously withdrawing used catalyst from the conversion zone during the reaction and continuously replacing catalyst particles thus withdrawn with active catalyst particles, thereby maintaining the volume of catalyst in said zone and the average activity thereof substantially constant throughout the reaction, maintaining a confined zone containing an accumulation of used catalyst thus withdrawn in proximity to but separate from the conversion zone, and maintaining said latter zone under an inert gas pressure greater than the pressure of said reaction zone and freeing the accumulated catalyst therein of entrained and adsorbed conversion products by circulating an inert gas therethrough.

4. A process as defined in claim 2 wherein a hot heat exchange medium is passed in close proximity to said moving bed to supply endothermic heat of cracking.

5. In the method of hydrocarbon oil conversion in which the conversion to other hydrocarbon compounds of different properties is brought about by pyrolysis in the presence of a solid contact material or agent, the improvement which consists in moving in a column said contact material from a bulk supply through a conversion chamber, to a receiver therefor, introducing hydrocarbon vapor to be converted adjacent one end of said chamber, withdrawing converted products adjacent the other end of said chamber while maintaining said vapor in said chamber at the conversion temperature, supplying hot inert gas at a point below said chamber and below the path of said vapors to be converted and at a point above said bulk supply, said gas being supplied at a somewhat greater pressure than that existing in said chamber, whereby leakage of vapors of conversion from said chamber into either said bulk supply or said receiver is prevented, and withdrawing said gas admixed with said converted products.

6. In a process for the catalytic conversion of hydrocarbons by passing the hydrocarbons in the vapor phase through a reaction zone filled with catalyst granules and maintained at a temperature suitable for the desired conversion, the improvement which consists in withdrawing used catalyst from said zone during the reaction and replacing catalyst thus withdrawn with active catalyst, thereby maintaining the volume of catalyst in said zone and the average activity thereof substantially constant throughout the reaction, and maintaining a confined zone containing a supply of active catalyst and a similar zone containing an accumulation of used catalyst, each respectively associated with the catalyst replacement and withdrawal portions of the reaction zone, under an inert gas pressure greater than the pressure of said reaction zone.

7. A process as defined in claim 2 further characterized by the step of continually moving the used catalyst from said intermediate purging and sealing zone through a confined transfer zone filled with an inert gas to said regeneration zone.

8. The continuous method of converting a liquid hydrocarbon oil into high quality gasoline by a process comprising catalytic cracking, which method comprises heating said oil to effect vaporization thereof and to effect superheating of the vapors to a conversion temperature, introducing said superheated vapors into a moving bed of catalyst in a conversion zone, introducing regenerated catalyst into said zone from a bulk supply thereof disposed above the conversion zone and removing used catalyst from the bottom of said zone thereby continuously maintaining the volume and average catalytic activity of the bed of catalyst in said zone substantially constant throughout the conversion, withdrawing the used catalyst out of the path of the vapors through the conversion zone to a purging and sealing zone maintained under a gaseous pressure higher than the conversion zone by passing an inert gas at a pressure higher than the pressure of said conversion zone in contact with the hot withdrawn catalyst thereby preventing the flow of reaction vapors from the conversion zone to said purging zone and removing hydrocarbons entrained with the catalyst, continuously regenerating said removed catalyst in a separate zone at high temperature and returning said high temperature regenerated catalyst to said bulk supply of regenerated catalyst above said conversion zone, introducing an inert gas into said bulk supply at a somewhat greater pressure than that existing in the conversion chamber whereby leakage of vapors of conversion from said chamber into said bulk supply is prevented, withdrawing the vaporous products from the conversion zone and fractionating them into a gasoline fraction, a gas fraction and at least one heavier-than-gasoline fraction.

9. The continuous method of converting a high-boiling liquid hydrocarbon oil into high-quality gasoline by a process comprising catalytic cracking which method comprises heating said oil to effect vaporization thereof, introducing said vapors into a moving bed of catalyst particles in a cracking zone at a pressure above atmospheric and at least sufficiently high to overcome the frictional resistance by said bed to the flow of the vapors therethrough, introducing regenerated catalyst particles from a bulk supply thereof disposed above the cracking zone into said zone and removing used catalyst particles from the bottom of said zone thereby continuously maintaining a bed of catalyst particles of both substantially constant volume and average catalytic activity in said zone throughout the conversion, withdrawing used catalyst out of the path of flow of the vapors through the cracking zone to a purging and sealing zone, removing hydrocarbons entrained with the withdrawn catalyst by passing an inert gas through the latter zone in contact with the catalyst therein at a pressure above atmospheric and sufficiently high relative to the pressure maintained in the cracking zone to effectively prevent leakage outward of reaction vapors from the conversion zone to said purging zone, continuously regenerating said removed catalyst in a separate zone at high temperature and continuously returning said high temperature regenerated catalyst to said bulk supply of regenerated catalyst above said conversion zone, introducing an inert gas into said bulk supply to maintain an inert gaseous atmosphere therein at a pressure above atmospheric and sufficiently high relative to the pressure maintained in the cracking zone to effectively prevent leakage of reaction vapors outward from the cracking zone to said bulk supply, withdrawing the vaporous products from the conversion zone and fractionating them into a gasoline fraction, a gas fraction and at least one heavier-than-gasoline fraction.

WILLIAM J. DEGNEN.
HENRY M. NELLY, Jr.
PERCIVAL C. KEITH, Jr.